Oct. 25, 1927. 1,646,470
H. C. WRIGHT ET AL
SHEARING BLADE FOR SHEEP SHEARS AND THE LIKE
Filed Oct. 24, 1925
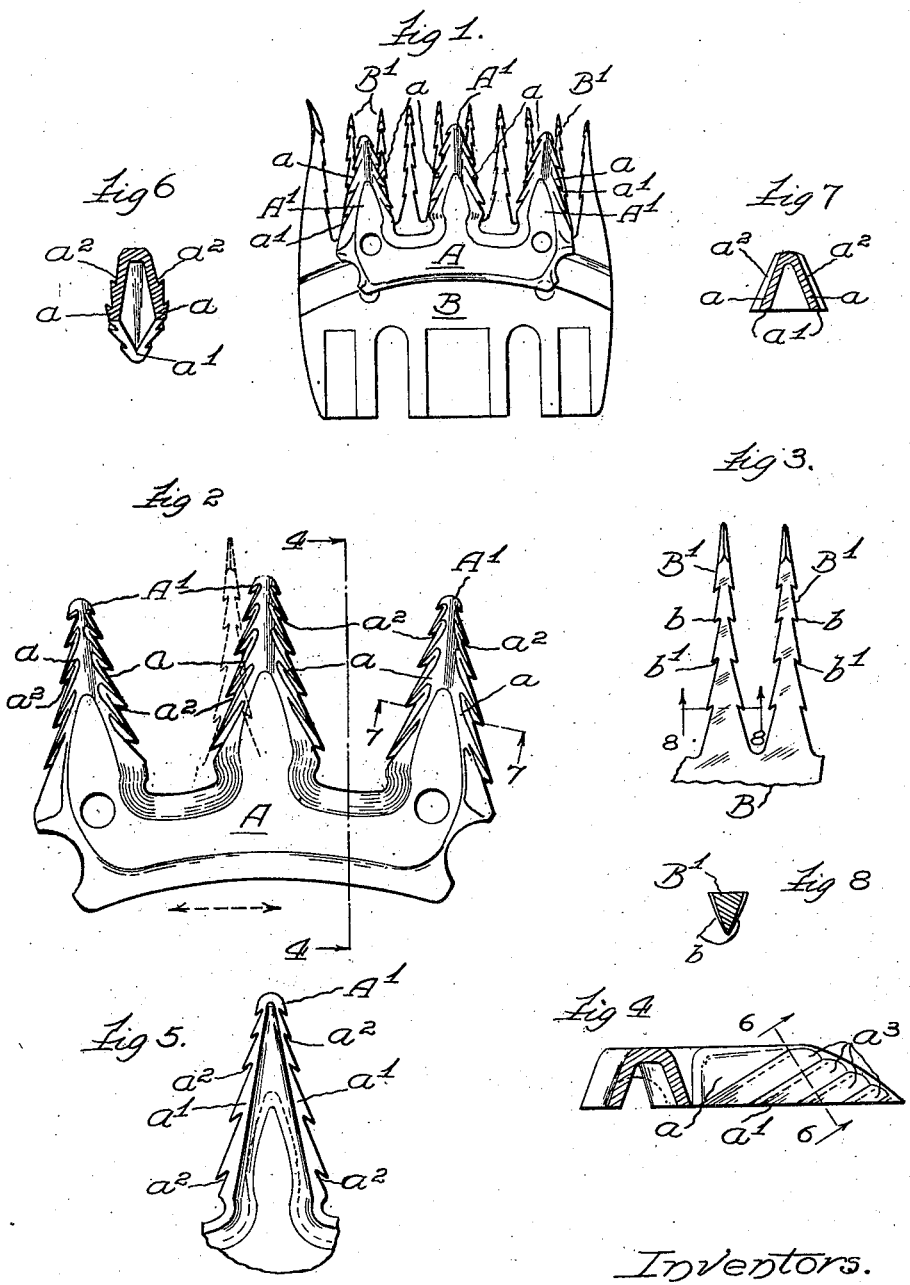

Patented Oct. 25, 1927.

1,646,470

UNITED STATES PATENT OFFICE.

HORACE C. WRIGHT AND FRANCISS G. BRISTOW, OF SYDNEY, NEW SOUTH WALES, AUSTRALIA, ASSIGNORS TO CHICAGO FLEXIBLE SHAFT COMPANY, A CORPORATION OF ILLINOIS.

SHEARING BLADE FOR SHEEP SHEARS AND THE LIKE.

Application filed October 24, 1925. Serial No. 64,500.

The purpose of this invention is to provide an improved form and construction of co-operating shear plates, commonly called cutter and comb respectively, of sheep shears and like implements. It consists in the elements and feature of construction shown and described as indicated in the claim.

In the drawings:—

Figure 1 is a plan view of a co-operating comb and cutter of sheep shear constructed according to this invention.

Figure 2 is a view on an enlarged scale of the vibrating cutter, with a single tooth of the comb shown in dotted line in co-operating position with respect to one tooth of the cutter.

Figure 3 is an enlarged plan view of two consecutive teeth or fingers of the comb.

Figure 4 is a section at the line 4—4 on Figure 2.

Figure 5 is an obverse or under side plan view of a single tooth of the cutter shown in Figure 2.

Figure 6 is a section at the line 6—6 on Figure 4.

Figure 7 is a section at the line 7—7 on Figure 2.

Figure 8 is a section at the line 8—8 on Figure 3.

The teeth of the cutter shown in the drawings, and preferably also the teeth or fingers of the comb, are serrated at their shearing edges. The characteristic of the invention consists in the form of these serrations which may be best understood as seen in the cutter, A, each of whose teeth, $A^1$, is in general approximately triangular in cross section, the opposite sloping upper sides, $a$—$a$, making acute angles with the shearing face, $a^1$. The serration grooves, $a^2$, are acute angled and formed extending in the sloping sides of the cutter teeth substantially parallel to each other, trending rearward, i. e., in the direction from point to heel of the tooth,—as they extend downward along the sloping sides of the teeth, with the result that they intersect the shearing face of the tooth in acute angles which open rearward, that is, with the teeth of the serrations pointing rearward,—as seen at $a^3$.

The fingers, $B^1$, of the comb, B, are similarly formed to the extent, at least, that they have acute angled teeth, $b$, formed by acute angled serration grooves in the back or under side of the comb teeth, which as to their length, trend backward from the point to base of the comb tooth or finger; so that the little serration teeth, $b$, point rearward, and the angles of the serration grooves or notches open rearward as seen at $b^1$, on Figure 3.

The purpose and result of making the serrations in the form described is that the hairs or fibers of the pelt subjected to shearing by the shear thus constructed, when encountered by the shearing edge of the vibrating cutter, if not severed at the first touch of the cutter or by the draw-cut immediately following, tend to slide along the long slope of the serration which encounters them toward and into the acute angle of the serration, with certainty of being severed when they reach the angle, if not severed by the first encounter or the draw-cut.

When the comb teeth are similarly formed, as shown in the drawings, the same sort of sliding of the fiber along the long slope of the serration tooth occurs when the edge of the finger encounters the fiber as the comb is advanced into the standing wool; and the fiber, if not severed by the draw-cut action, is eventually stopped in the acute angle of the serrations where it cannot escape severance.

Preferably, the serrations of the cutter and the comb are relatively staggered as seen in Figure 2, so that in the stroke of the cutter tooth past the comb tooth or finger, the serration teeth of the cutter cross the long slope of the serration of the comb finger about midway in the length of said long slope. The advantage of thus relating the serrations of the two co-operating shear members is obvious, viz, that no fiber can slide more than half the length of the long slope of the serration tooth of cutter or comb before being stopped in the acute angle of one or the other.

We claim: —

A shear member for sheep shears and the like having shear teeth tapered widening rearwardly, and having in the rearwardly diverging sides angular serrations intersecting the shearing face and rendering the cutting edges of the shear teeth toothed, the planes of the forward surfaces of said serrations being at rearwardly-pointing acute angles to said rearwardly diverging sides of the shear teeth, the teeth produced by said serrations of the co-operating shear teeth of the cutter and comb respectively being relatively staggered for alternating from front to rear along the length of said cutter and comb teeth to cause the points of the serration teeth of each of said shearing members to cross the outwardly-facing slopes of the serration teeth of the other member intermediate the length of said slopes; whereby fibers encountered and engaged between the cutter and comb teeth are exposed to the draw cut along said slopes of the serrations and are driven into an angle of the serrations of one or the other of said co-operating shear members after exposure to the draw cut for not more than half the length of said slopes.

In testimony whereof, we have hereunto set our hands at Chicago, Illinois, this 19th day of October, 1925.

FRANCISS G. BRISTOW.
HORACE C. WRIGHT.